(No Model.)

J. M. CROWLEY.
DOUGH KNEADER.

No. 513,175. Patented Jan. 23, 1894.

WITNESSES
A. B. Degges
L. S. Henrichs

INVENTOR
John M. Crowley
by E. E. Masson, Attorney.

THE NATIONAL LITHOGRAPHING COMPANY,
WASHINGTON, D. C.

UNITED STATES PATENT OFFICE.

JOHN M. CROWLEY, OF AUGUSTA, GEORGIA.

DOUGH-KNEADER.

SPECIFICATION forming part of Letters Patent No. 513,175, dated January 23, 1894.

Application filed November 13, 1893. Serial No. 490,781. (No model.)

*To all whom it may concern:*

Be it known that I, JOHN M. CROWLEY, a citizen of the United States, residing at Augusta, in the county of Richmond, State of Georgia, have invented certain new and useful Improvements in Dough-Kneaders, of which the following is a specification, reference being had therein to the accompanying drawings.

The objects of this invention are to produce a simple and inexpensive machine adapted for family use, to easily and quickly transform dough to a proper condition and consistency for baking without the addition of saleratus or of baking powders, and that when baked will be palatable and healthful; also to provide a machine of this class with a removable but unyielding revoluble kneading beater and a removable bottom easily cleaned and adapted for use in the formation of pastry, biscuits, &c. I attain these objects by the construction illustrated in the accompanying drawings, in which—

Figure 1:
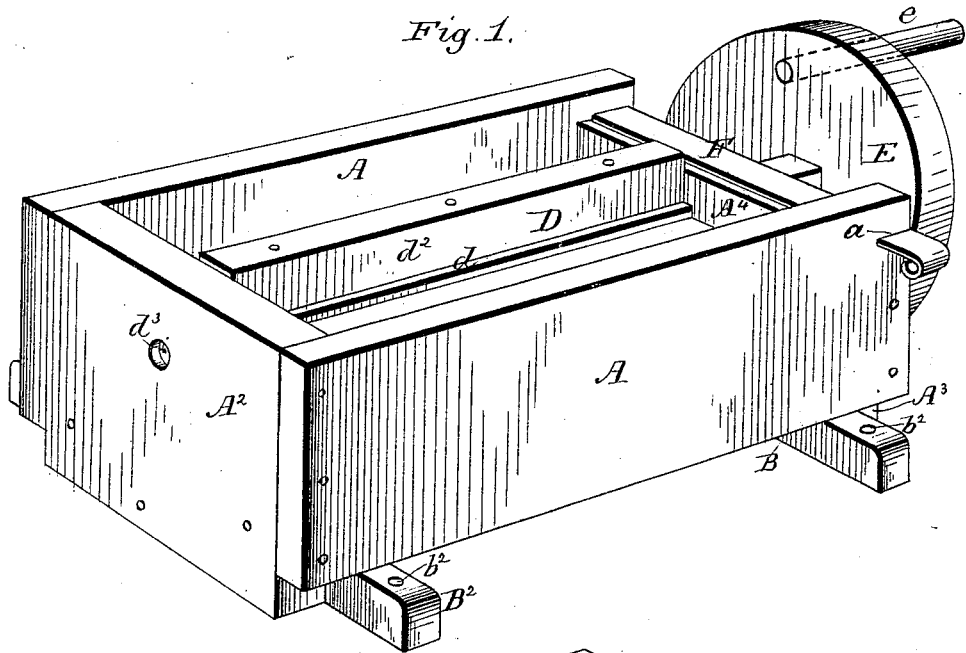
Figure 2:
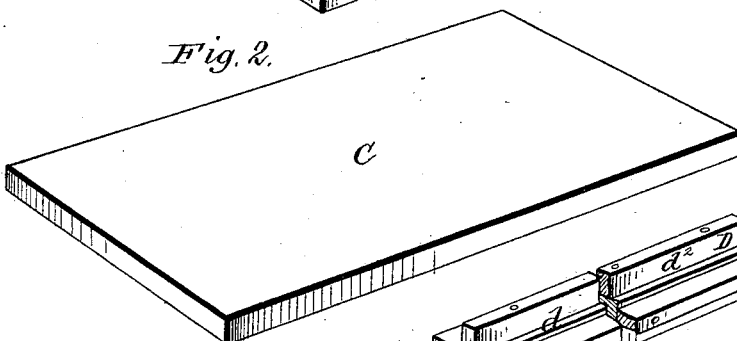
Figure 4:
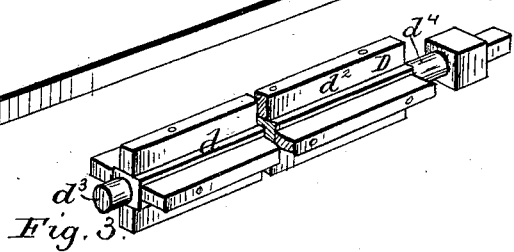
Figure 3:
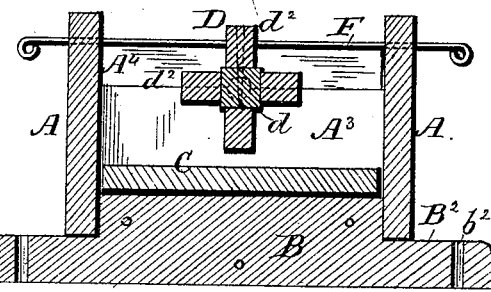

Figure 1 is a perspective view of a dough-kneader constructed in accordance with my invention. Fig. 2 is a perspective view of the removable bottom detached from the machine. Fig. 3 is a transverse vertical section of the machine through one of the cross supports thereof, and with the driving wheel removed. Fig. 4 is a perspective view of the kneading beater on a smaller scale.

The machine consists of an open-top rectangular box having the two sides A secured together by means of nails to the end boards $A^2$ and $A^3$. The side boards A have their bottom edges resting upon wood supports B, that extend across said edges adjacent to their ends. Said supports extend beyond the sides A and said extensions $B^2$ constitute the equivalent of legs for the machine, and said legs have perforations $b^2$ to receive screws to fasten the machine to a bench or other suitable platform. The supports B are nailed to the end boards $A^2$ and $A^3$, and have their middle portion extended up within the inclosure formed by the sides A, $A^2$, $A^3$. Upon said middle portion of the supports B, is removably laid the bottom board C. The size of the board C is substantially equal to the size of the opening between the side board A and the end boards $A^2$ and $A^3$ of the machine, but yet the board C can be easily lifted from its supports B if a person's hand is introduced thereunder, and said board removed from the machine to thoroughly clean the latter or to permit said board C to be used as a bread, biscuit, and pastry molding board.

When the bottom board C is in its normal position, it constitutes with the sides and end boards, an open-top box adapted to receive the dough that is to be beat and kneaded. Centrally within said box is mounted the revoluble kneading beater D, which consists of a square core or shaft $d$ having four rectangular wings $d^2$ projecting from its sides. One end $d^3$ of said shaft is made cylindrical and is received in a perforation in the end board $A^2$ while the opposite end carries a hand wheel E by which it can be rotated, said wheel having a handle $e$ projecting from its outer face. At a short distance from the inner face of the wheel E the shaft $d$ has a cylindrical portion $d^4$ formed thereon to constitute the second journal of said shaft. Said second journal is received in a semi-cylindrical cavity or bearing formed in the upper edge of the end board $A^3$; and upon said edge is placed a bearing cap or block $A^4$ the length of which is equal to that of the end-board $A^3$, but its top is on a lower level than the upper edge of the side boards A. To retain the cap-block firmly upon the journal forming part of the shaft $d$, a strip of sheet metal F is placed upon the top of the cap-block, and to retain said strip in position it is inserted in slots $a$, made in the ends of the side boards A on the same level as the top of the block $A^4$. As the length of the wings $d^2$ is slightly less than the length of the interior of the box, the beater D can easily be removed from said box after removing the metal strip F and cap-block $A^4$ from their normal position.

As the bearings for the shaft of the beater are unyielding, and the periphery of its wings travels in a path within a short distance (preferably three-eighths of an inch) from the bottom board C, portions of the dough are subjected to strong kneading at each revolution of the beater, and new portions are successively presented to its action, it is thus rapidly brought to a proper condition for baking.

Having now fully described my invention, I claim—

1. A dough-kneader consisting of a rectangular frame having supports B received in part between the sides of said frame and also under its bottom edge, and a removable bottom loosely received within said frame and resting upon said supports B, with a revoluble beater supported by, and unyieldingly retained within said frame substantially as described.

2. In a dough kneader the combination of a rectangular frame consisting of two side boards A of equal height and two end boards $A^2$ $A^3$ of unequal height, a cap-block $A^4$ resting upon the board $A^3$, a strip F resting upon the block $A^4$ and having its ends secured in slots in the ends of the boards A, supports B under the bottom edge of said frame, and a removable bottom loosely received within said frame, upon said supports, with a revoluble beater having its shaft unyieldingly retained within said frame substantially as described.

In testimony whereof I affix my signature in presence of two witnesses.

JOHN M. CROWLEY.

Witnesses:
THADS OAKMAN,
FRED T. LOCKHART.